United States Patent
Lee et al.

(10) Patent No.: US 9,638,170 B2
(45) Date of Patent: May 2, 2017

(54) SOLAR POWERED WIND TURBINE APPARATUS FOR REDUCING OR ELIMINATING WIND CUT-IN SPEED

(71) Applicants: William Edward Lee, Kailua, HI (US); Baldev Krishan, Pleasanton, CA (US)

(72) Inventors: William Edward Lee, Kailua, HI (US); Baldev Krishan, Pleasanton, CA (US)

( * ) Notice: Subject to any disclaimer, the term of this patent is extended or adjusted under 35 U.S.C. 154(b) by 0 days.

(21) Appl. No.: 14/335,890

(22) Filed: Jul. 19, 2014

(65) Prior Publication Data

US 2015/0021913 A1 Jan. 22, 2015

Related U.S. Application Data

(60) Provisional application No. 61/856,760, filed on Jul. 21, 2013.

(51) Int. Cl.
| | | |
|---|---|---|
| *F03D 9/00* | (2016.01) | |
| *F03D 7/02* | (2006.01) | |
| *H02K 7/14* | (2006.01) | |
| *H02K 7/18* | (2006.01) | |

(52) U.S. Cl.
CPC ............ *F03D 7/026* (2013.01); *F03D 9/007* (2013.01); *H02K 7/14* (2013.01); *H02K 7/183* (2013.01); *F05B 2220/708* (2013.01); *Y02E 10/723* (2013.01); *Y02E 10/725* (2013.01)

(58) Field of Classification Search
CPC .................................. F03D 9/007; F03D 7/025
USPC ............. 290/44, 55; 60/641.11, 641.12, 698; 415/4.1, 4.2, 4.5; 416/111, 117
See application file for complete search history.

(56) References Cited

U.S. PATENT DOCUMENTS

| | | | | |
|---|---|---|---|---|
| 4,551,631 A | * | 11/1985 | Trigilio | F03D 3/0409 290/1 R |
| 4,735,382 A | * | 4/1988 | Pinson | B64G 1/426 244/150 |
| 5,275,643 A | * | 1/1994 | Usui | E03B 3/28 290/55 |
| 7,453,167 B2 | * | 11/2008 | Gilbert | F03D 3/005 290/55 |
| 2009/0261595 A1 | * | 10/2009 | Poo | F03D 3/02 290/55 |

(Continued)

FOREIGN PATENT DOCUMENTS

JP 61251445 A * 11/1986

*Primary Examiner* — Julio C Gonzalez
(74) *Attorney, Agent, or Firm* — Law Office of Dorian Cartwright; Dorian Cartwright (57) ABSTRACT

A method and an apparatus are provided for initiating rotation of blades of a wind turbine when wind speed is less than a cut-in speed. A solar powered wind turbine apparatus includes a solar dome with photovoltaic cells, operably connected to a rotor assembly, and an electric motor. The photovoltaic cells convert solar energy from incident sunlight into electrical energy. The electric motor electrically connected to the photovoltaic cells rotates the blades of the rotor assembly using the electrical energy from the photovoltaic cells. The electric motor powered by the photovoltaic cells initiates the rotation of the blades of the rotor assembly when wind speed is less than the cut-in speed, and therefore reduces or eliminates the cut-in speed required to rotate the blades. The blades of the rotor assembly thereafter continue to rotate in response to a force of wind on the blades and/or the powered electric motor.

15 Claims, 6 Drawing Sheets

(56) References Cited

U.S. PATENT DOCUMENTS

| | | | |
|---|---|---|---|
| 2010/0060003 A1* | 3/2010 | DeAngeles | F03D 7/0224 290/44 |
| 2011/0121575 A1* | 5/2011 | Anetrini | F03D 9/007 290/55 |
| 2011/0215583 A1* | 9/2011 | Lee | F03D 9/00 290/55 |
| 2011/0215587 A1* | 9/2011 | Lee | F03D 9/00 290/55 |
| 2014/0103760 A1* | 4/2014 | Dugas | H02K 7/025 310/74 |

* cited by examiner

SOLAR POWERED WIND TURBINE APPARATUS FOR REDUCING OR ELIMINATING WIND CUT-IN SPEED

CROSS REFERENCE TO RELATED APPLICATIONS

This application claims priority to and the benefit of provisional patent application No. 61/856,760 titled "Solar Powered Wind Turbine Apparatus With Reduced Cut-in Speed", filed in the United States Patent and Trademark Office on Jul. 21, 2013. The specification of the above referenced patent application is incorporated herein by reference in its entirety.

BACKGROUND

Conventional wind turbines harness the energy of wind and convert the energy to a form of mechanical energy. The mechanical energy may further be converted to electrical energy based on the application in which the wind turbine is used. Nearly all conventional wind turbines require a minimum wind speed to rotate their blades. This wind speed is called a cut-in speed. As is known, power output of a wind turbine is directly proportional to a cube of the wind speed. Therefore, for example, about 10% increase in the wind speed results in about 33% increase of power output. Sometimes, the wind does not attain the cut-in speed, resulting in non-rotation of the blades of the wind turbine and therefore non-generation of electric power. However, when the wind attains or exceeds the cut-in speed, the wind turbine rotates at a speed proportional to the wind speed. This dependency on attainment of the cut-in speed by the wind speed reduces the power that is generated by the wind turbine resulting in low electric power production. There is a need for an alternate power source that provides power to initiate rotation of the blades of the wind turbine when the wind is less than the cut-in speed, thereby reducing or eliminating the cut-in speed required to rotate the blades of the wind turbine.

Hence, there is a long felt but unresolved need for a method and an apparatus that provides power to rotate the blades of a wind turbine when the wind speed is less than the cut-in speed, thereby reducing or eliminating a cut-in speed required to rotate the blades of the wind turbine.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The method and the solar powered wind turbine apparatus disclosed herein address the above mentioned need for providing power to rotate blades of a wind turbine when the speed of wind is less than a cut-in speed, thereby reducing or eliminating the cut-in speed required to rotate the blades of the wind turbine. The solar powered wind turbine apparatus disclosed herein is configured as a solar powered horizontal axis wind turbine apparatus or a solar powered vertical axis wind turbine apparatus. The solar powered wind turbine apparatus disclosed herein comprises a solar dome with photovoltaic cells, a rotor assembly with blades, and an electric motor. The solar dome is an encasing that houses and supports an interconnected assembly of photovoltaic cells on a surface of the solar dome. The solar dome is operably connected to the rotor assembly. The solar dome is configured to house the photovoltaic cells to enable the photovoltaic cells to receive solar energy from multiple sunlight directions. The solar dome is positioned on multiple, movable and configurable locations on the solar powered wind turbine apparatus. The solar dome protrudes outwardly and is configured to be rotatable to face the sunlight.

The photovoltaic cells housed in the solar dome are exposed to sunlight and convert solar energy from sunlight incident on the photovoltaic cells into electrical energy. The electric motor of the solar powered wind turbine apparatus is electrically connected to the photovoltaic cells housed in the solar dome. The photovoltaic cells transfer the electrical energy generated from the incident sunlight to the electric motor. The electric motor rotates the rotor assembly with the blades using the electrical energy transferred by the photovoltaic cells. The electric motor powered by the photovoltaic cells on the solar dome initiates the rotation of the blades of the rotor assembly when the speed of wind is less than the cut-in speed, and therefore reduces or eliminates the cut-in speed required to rotate the blades of the rotor assembly. Once the blades are set in rotational movement, the blades of the rotor assembly will continue to rotate in proportion to the wind speed and/or the electrical energy produced by the photovoltaic cells. The rotation of the solar dome cools the photovoltaic cells housed in the solar dome with more airflow and decreases the temperature increase of the photovoltaic cells, thereby increasing the efficiency of the photovoltaic cells for producing electrical energy.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing carries over to the description of that method step or structure shown by that same numeral in any subsequent drawing herein.

DETAILED DESCRIPTION OF THE INVENTION

Figure 1:
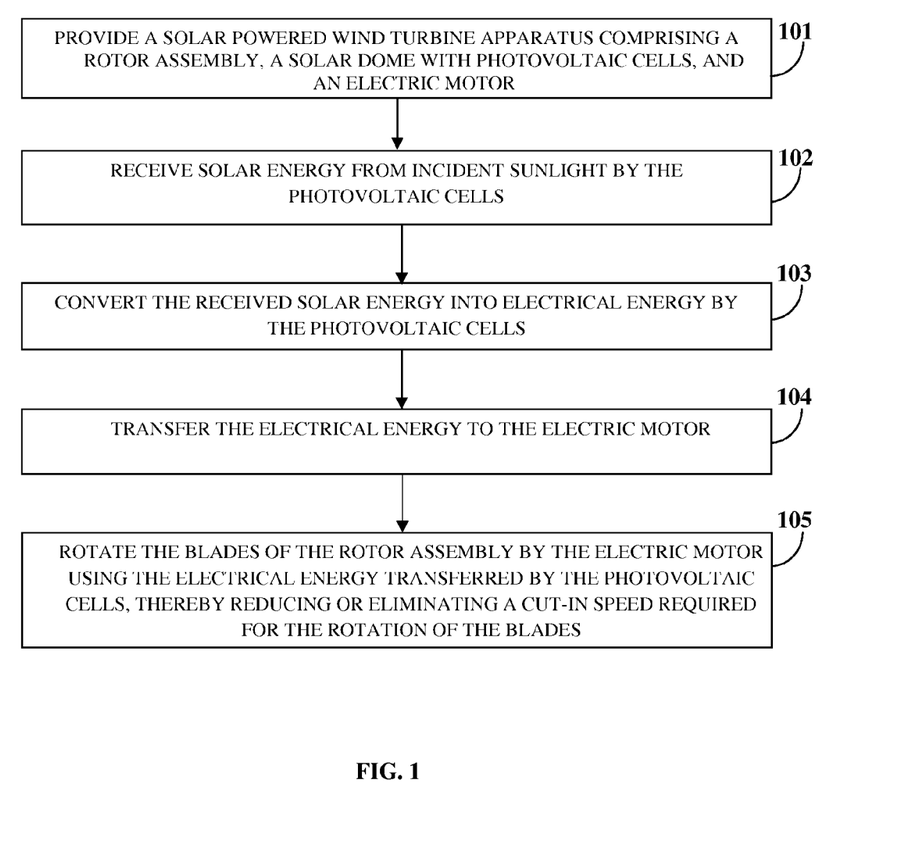
FIG. 1 illustrates a method for initiating rotation of blades of a wind turbine when the speed of wind is less than a cut-in speed, thereby reducing or eliminating the cut-in speed requirement of the wind turbine.

FIG. 1 illustrates a method for initiating rotation of blades 204 of a wind turbine 200 or 300 exemplarily illustrated in FIGS. 2A-2B and FIGS. 3A-3B, when the speed of wind is less than a cut-in speed, thereby reducing or eliminating the cut-in speed requirement of the wind turbine 200 or 300. As used herein, the term "cut-in speed" refers to a minimum speed of wind at which the blades 204 of a wind turbine 200 or 300 start rotating in response to power from the wind or an alternative source. By way of example, consider a wind turbine 200 or 300 that has a cut-in speed of 5 miles per hour. When the speed of the wind traversing the wind turbine 200 or 300 is, for example, from 0 miles per hour to any speed less than 5 miles per hour, the blades 204 of the wind turbine 200 or 300 will not rotate. When the wind speed traversing the wind turbine 200 or 300 reaches 5 miles per hour, the blades 204 of the wind turbine 200 or 300 will start rotating. In this example, the method disclosed herein reduces the cut-in speed to less than 5 miles per hour. In the method disclosed herein, a solar powered wind turbine apparatus 200 or 300 comprising a solar dome 203, a rotor assembly 202 or 301 with multiple blades 204, and an electric motor 215 or 306 as exemplarily illustrated in FIGS. 2A-2B and FIGS. 3A-3B, is provided 101.

Figure 2A:
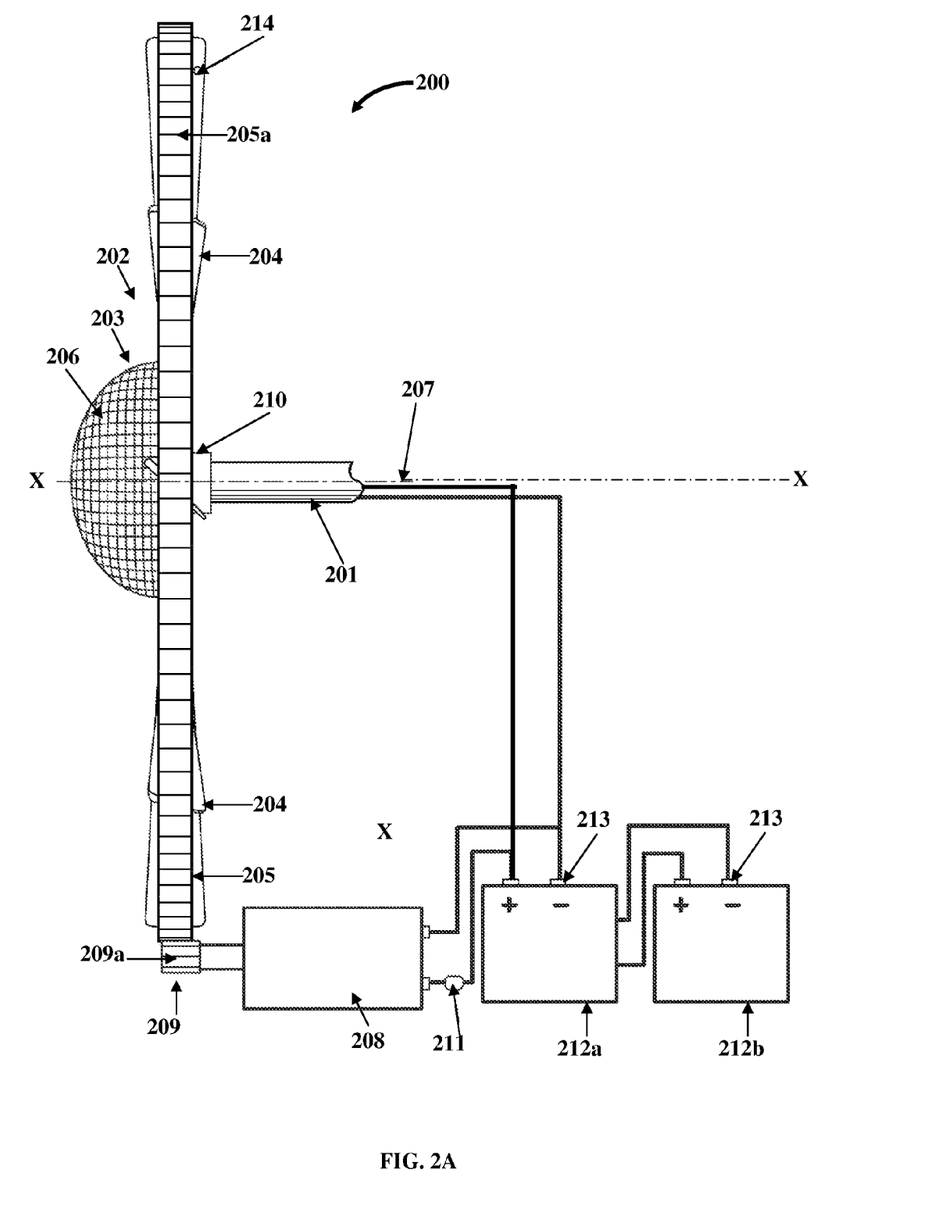
FIG. 2A exemplarily illustrates a partial side elevation view of a solar powered horizontal axis wind turbine apparatus for reducing or eliminating wind cut-in speed.
Figure 2B:
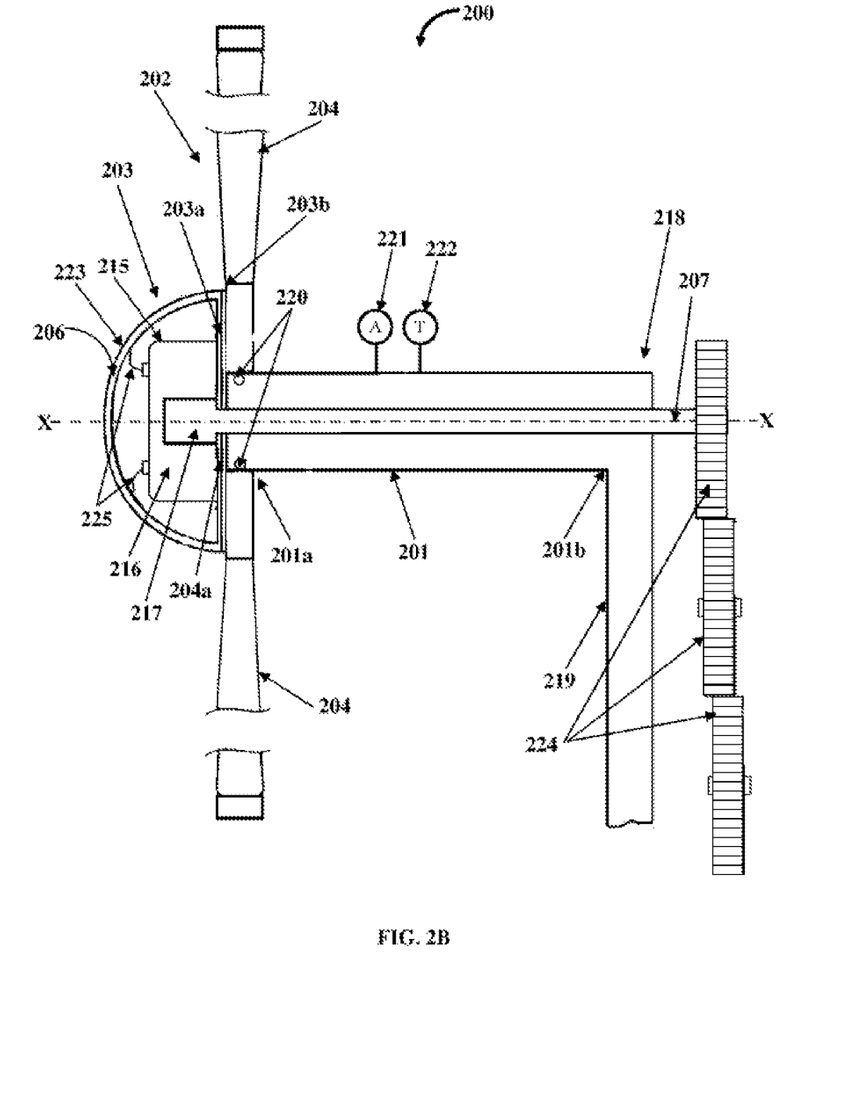
FIG. 2B exemplarily illustrates a partial sectional view of the solar powered horizontal axis wind turbine apparatus, showing an electric motor and a frame.
Figure 3A:
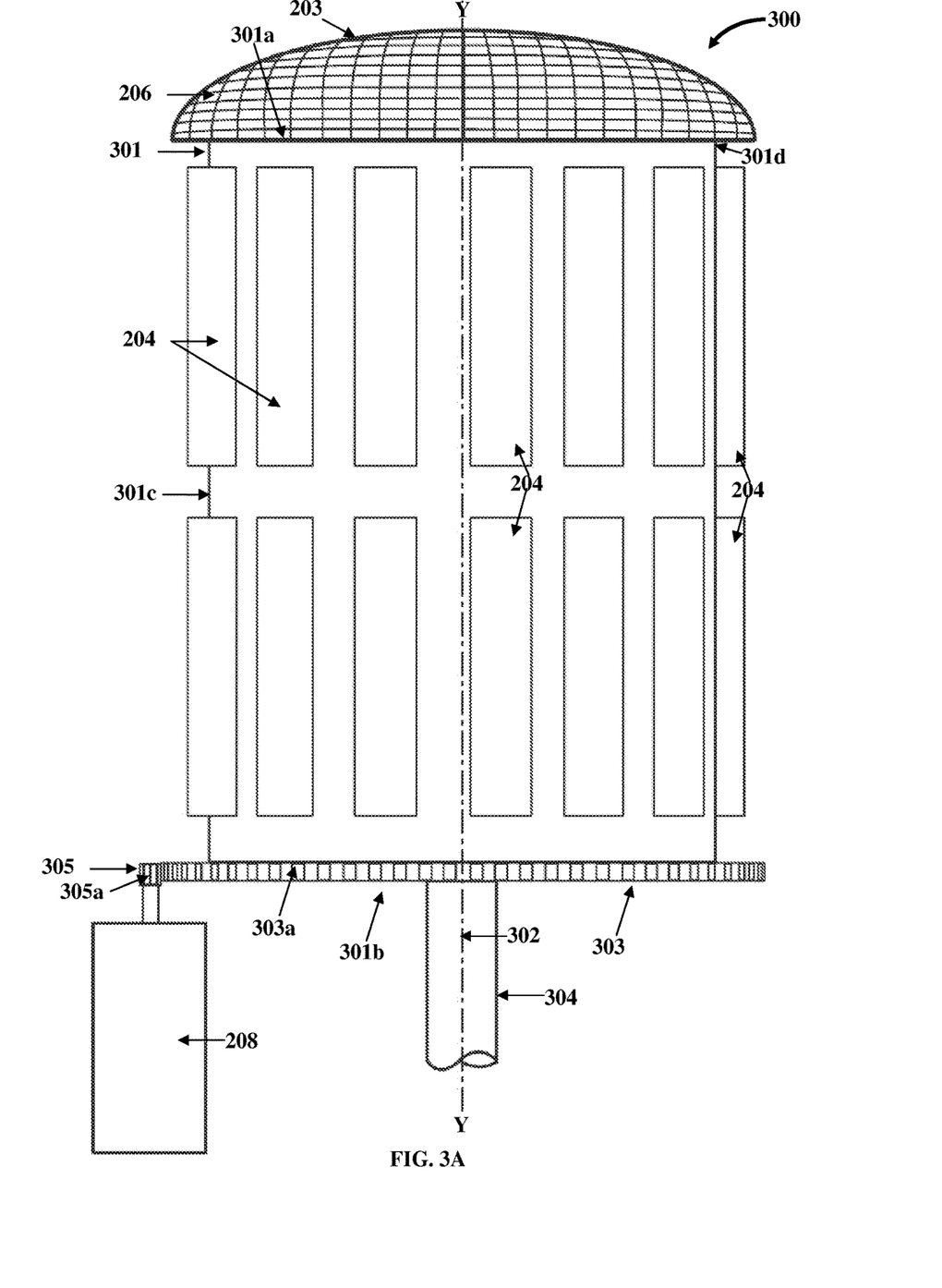
FIG. 3A exemplarily illustrates a front elevation view of a solar powered vertical axis wind turbine apparatus for reducing or eliminating wind cut-in speed.
Figure 3B:
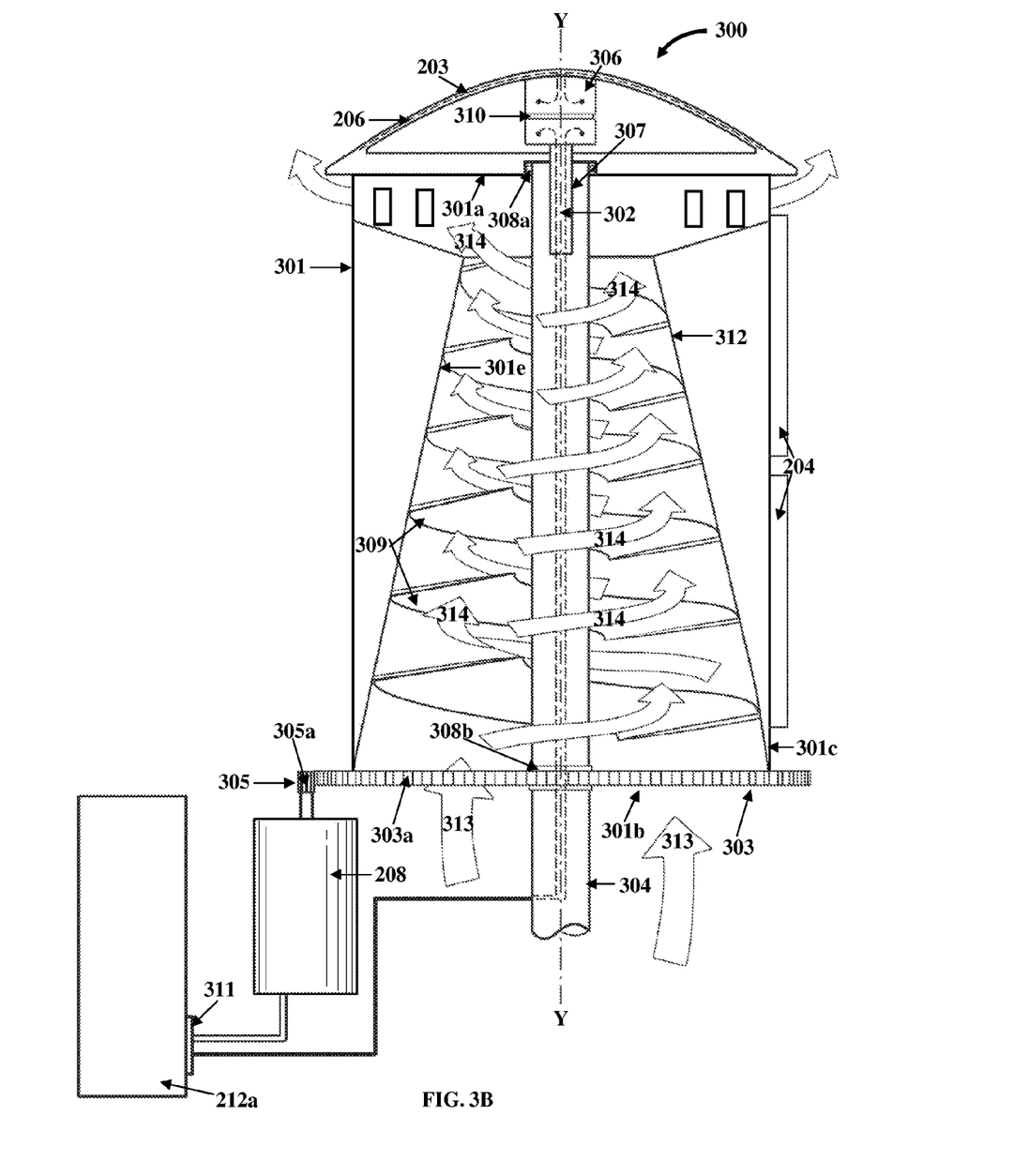
FIG. 3B exemplarily illustrates a partial cut-away front sectional view of an embodiment of the solar powered vertical axis wind turbine apparatus, showing an electric motor.

The solar powered wind turbine apparatus is configured, for example, as a solar powered horizontal axis wind turbine apparatus 200 as exemplarily illustrated and disclosed in the detailed description of FIGS. 2A-2B, or as a solar powered vertical axis wind turbine apparatus 300 as exemplarily illustrated and disclosed in the detailed description of FIGS. 3A-3B. The solar dome 203 is an encasing that houses and supports a packaged interconnected assembly of photovoltaic cells 206 on the surface of the solar dome 203 as exemplarily illustrated in FIG. 2A and FIG. 3A. The solar dome 203 enables the photovoltaic cells 206 to receive 102 the solar energy from multiple sunlight directions. The solar dome 203 is operably connected to the rotor assembly 202 or 301 as exemplarily illustrated in FIGS. 2A-2B and FIGS. 3A-3B. For example, the solar dome 203 is rigidly attached to the rotor assembly 202 or 301. In an embodiment, the solar dome 203 is rotatable about a horizontal axis X-X 207 as exemplarily illustrated in FIGS. 2A-2B, or about a vertical axis Y-Y 302 as exemplarily illustrated in FIGS. 3A-3B, to enable the photovoltaic cells 206 to receive the solar energy from multiple directions of incident sunlight.

The photovoltaic cells 206 housed in the solar dome 203 are exposed to the sunlight and convert 103 the solar energy received from incident sunlight on the photovoltaic cells 206 into electrical energy by a photovoltaic effect. The photovoltaic cells 206 are made out of a semiconductor material. When a photon is absorbed by the photovoltaic cell 206, electrons from the atoms of the semiconductor material are dislodged from their positions. These electrons travel toward a front surface of the photovoltaic cell 206 and flow on the front surface of the photovoltaic cell 206. This flow of electrons generates electrical energy which is transferred to the electric motor 215 or 306.

The electric motor 215 or 306 of the solar powered wind turbine apparatus 200 or 300 is electrically connected to the photovoltaic cells 206 housed in the solar dome 203. The photovoltaic cells 206 transfer 104 the electrical energy generated from the incident sunlight to the electric motor 215 or 306. The electric motor 215 or 306 rotates the rotor assembly 202 or 301 with the rigidly attached solar dome 203, and therefore rotates 105 the blades 204 housed in the rotor assembly 202 or 301, using the electrical energy transferred by the photovoltaic cells 206, thereby reducing or eliminating the cut-in speed required for the rotation of the blades 204. When the solar powered horizontal axis wind turbine apparatus 200 or the solar powered vertical axis wind turbine apparatus 300 at rest are acted upon by wind, the blades 204 of the rotor assembly 202 or 301 have a tendency to initially rotate in a clockwise direction or a counterclockwise direction, according to the direction of wind. Despite the initial clockwise or counterclockwise rotation of the blades 204 of the rotor assembly 202 or 301 according to the direction of wind, the electric motor 215 or 306 redirects the rotation of the blades 204 in the desired direction, for example, a clockwise direction or a counterclockwise direction. Once the blades 204 are rotated, inertia maintains the blades 204 of the rotor assembly 202 or 301 in rotational motion as a body in motion tends to stay in motion.

The electric motor 215 or 306 powered by the photovoltaic cells 206 on the solar dome 203 provides the initial power to initiate the rotation of the blades 204 of the rotor assembly 202 or 301 when the speed of wind is less than the cut-in speed, thereby reducing or eliminating the cut-in speed required to rotate the blades 204 of the rotor assembly 202 or 301. Once the blades 204 start rotating, the blades 204 of the rotor assembly 202 or 301 continue to rotate at a speed proportional to the wind speed due to the force of wind on the blades 204 and the electrical energy produced by the photovoltaic cells 206. Furthermore, the rotation of the rigidly attached solar dome 203 is at speed of, for example, about 10 revolutions per minute (rpm) to about 1000 rpm, which cools the photovoltaic cells 206 housed in the solar dome 203 and decreases the temperature increase of the photovoltaic cells 206, thereby increasing the power generation efficiency of the photovoltaic cells 206.

Under high temperature conditions, cooling the photovoltaic cells 206 increases power output of the photovoltaic cells 206. The overall efficiency of the solar powered wind turbine apparatus 200 or 300 depends on the rotation of the rotor assembly 202 or 301 and the resultant lowering of temperature of the photovoltaic cells 206. The high speed rotation of the rotor assembly 202 or 301 cools the photovoltaic cells 206 housed in the solar dome 203. The rotation of the rotor assembly 202 or 301 circulates ambient air around the photovoltaic cells 206 housed in the solar dome 203 and lowers the temperature of the photovoltaic cells 206, which minimizes heat build-up in the photovoltaic cells 206 and prevents over heating of the photovoltaic cells 206, thereby allowing the photovoltaic cells 206 to operate more efficiently and generate more electrical energy or electric power. Due to the lowered temperature of the photovoltaic cells 206, an increased number of photons from the solar energy of incident sunlight are absorbed by the photovoltaic cells 206, thereby dislodging an increased number of electrons from the atoms of the semiconductor material. These electrons then flow toward the front surface of the photovoltaic cells 206. The lowered operating temperature of the photovoltaic cells 206 facilitates better flow of electrons on the front surface of the photovoltaic cells 206, thereby increasing the amount of electrical energy output of the photovoltaic cells 206. The continuous rotation of the rotor assembly 202 or 301 at high rpm generates a high velocity air flow over the surface of the photovoltaic cells 206 and keeps dust and other materials from the environment from depositing and building up on the surface of the photovoltaic cells 206, thereby increasing the efficiency of the photovoltaic cells 206. In an embodiment, the wind energy and the solar powered rotational energy from the electric motor 215 or 306 together increase output power of the solar powered wind turbine apparatus 200 or 300.

FIG. 2A exemplarily illustrates a partial side elevation view of a solar powered horizontal axis wind turbine apparatus 200 for reducing or eliminating wind cut-in speed. The solar powered horizontal axis wind turbine apparatus 200 disclosed herein comprises a frame 218 exemplarily illustrated in FIG. 2B, the rotor assembly 202, the solar dome 203 with photovoltaic cells 206, and an electric motor 215. The electric motor 215 of the solar powered horizontal axis wind turbine apparatus 200 has a body 216 and a shaft 217 as exemplarily illustrated in FIG. 2B. The electric motor 215 is, for example, a direct current (DC) motor. The electric motor 215 is electrically connected to the photovoltaic cells 206. The body 216 of the electric motor 215 is rigidly connected to the closed end 203a of the solar dome 203 of the rotor assembly 202 as exemplarily illustrated in FIG. 2B. The shaft 217 of the electric motor 215 extends from the body 216 of the electric motor 215 and is rigidly connected to the stationary axle 201 of the frame 218. In an embodiment, the shaft 217 of the electric motor 215 is fixed. The body 216 of the electric motor 215 is rotatable about the shaft 217 of the electric motor 215. The electric motor 215 receives electrical energy from the photovoltaic cells 206 rigidly attached on the solar dome 203 and/or on the blades 204 of the rotor assembly 202. The electric motor 215 rotates the rotor assembly 202 about a horizontal axis X-X 207 of the stationary axle 201 of the frame 218 on receiving electrical energy produced by the photovoltaic cells 206. The rotor assembly 202 is configured to rotate about the horizontal axis X-X 207 in response to a force of wind on the blades 204 and the powered electric motor 215.

In an embodiment, the solar powered horizontal axis wind turbine apparatus 200 further comprises a first drive mechanism 205 encircling the blades 204 of the rotor assembly 202, and an electric generator 208 as exemplarily illustrated in FIG. 2A. The electric generator 208 is engageably connected to the rotor assembly 202 via the first drive mechanism 205. The first drive mechanism 205 is rigidly attached to the blades 204 of the rotor assembly 202. The blades 204 of the rotor assembly 202 are rigidly connected to a periphery 203b of the solar dome 203 exemplarily illustrated in FIG. 2B, and are encircled by the first drive mechanism 205. The blades 204 extend radially from the solar dome 203. The first drive mechanism 205 that encircles the blades 204 of the rotor assembly 202 engageably communicates with a second drive mechanism 209 rigidly connected to the electric generator 208. For example, a gear ring 205a encircling the blades 204 is in engageable communication with a gear ring 209a rigidly connected to the electric generator 208. The gear ring 205a rigidly connected to the rotor assembly 202 engageably communicates with the gear ring 209a rigidly connected to the electric generator 208 for transferring mechanical energy produced by the rotation of the rotor assembly 202 to the electric generator 208. The electric generator 208 converts the mechanical energy produced by the rotor assembly 202 into electrical energy.

In an embodiment, the solar powered horizontal axis wind turbine apparatus 200 comprises one or more energy storage devices 212a and 212b in electric communication with the photovoltaic cells 206 on the solar dome 203 of the rotor assembly 202 and the electric generator 208. The electric generator 208 is electrically connected to the energy storage devices 212a and 212b. The energy storage devices 212a and 212b store the electrical energy produced by the photovoltaic cells 206 and the electric generator 208. The stored electrical energy is used for multiple purposes, for example, providing power to the electric motor 215 to rotate the blades 204 of the solar powered horizontal axis wind turbine apparatus 200. The stored electrical energy activates the electric motor 215 by powering the electric motor 215 to rotate the blades 204 of the rotor assembly 202 when there is minimal or no wind in the vicinity of the solar powered horizontal axis wind turbine apparatus 200. The stored electrical energy also supports the rotation of the blades 204 of the rotor assembly 202 by powering the electric motor 215 when the wind speed is at a wind speed level between a cut-in speed and a cut-out speed. As used herein, "cut-out speed" refers to the highest wind speed at which a wind turbine stops producing power. The stored electrical energy also enables a uniform and continuous power output of the solar powered horizontal axis wind turbine apparatus 200.

In an embodiment, the solar powered horizontal axis wind turbine apparatus 200 disclosed herein further comprises a switch 213 in electric communication with the photovoltaic cells 206, the electric motor 215, and the energy storage devices 212a and 212b. The switch 213 is used to break an electrical circuit formed by the photovoltaic cells 206, the electric motor 215, and the energy storage devices 212a and 212b for interrupting the electrical energy, for example, current, or for diverting the electrical energy from the photovoltaic cells 206 to the energy storage devices 212a and 212b or from the energy storage devices 212a and 212b to the electric motor 215. The switch 213 is configured to transfer the electrical energy produced by the photovoltaic cells 206 to the electric motor 215 and/or the energy storage devices 212a and 212b. The electrical energy stored in one energy storage device, for example, 212a powers the electric motor 215 for rotating the rotor assembly 202, while the electrical energy stored in another energy storage device, for example, 212b is transferred to one or more external energy stations. In an example, the energy storage device 212a transfers the stored electrical energy to the electric motor 215, for example, during nighttime. The energy storage device 212b provides power to other energy stations, for example, a power grid, a substation, etc. In an embodiment, the switch 213 electrically disconnects the photovoltaic cells 206 from the electric motor 215 and transfers the electrical energy produced by the photovoltaic cells 206 to the energy storage devices 212a and 212b. In this embodiment, the rotation of the blades 204 of the rotor assembly 202 is continued by the force of wind on the blades 204 of the rotor assembly 202 after the electrical disconnection of the photovoltaic cells 206 from the electric motor 215.

In the presence of sunlight, the switch 213 may be configured to transfer the electrical energy produced by the photovoltaic cells 206 to the electric motor 215 and also to the energy storage devices 212a and 212b, thereby charging the energy storage devices 212a and 212b. In the absence of sunlight, the switch 213 may be configured to transfer the electrical energy stored in the charged energy storage devices 212a and 212b to the electric motor 215 to provide a turning moment to the rotor assembly 202. Subsequently, the charged energy storage devices 212a and 212b may continue to remain connected or may be disconnected from the electric motor 215 as desired by a user depending on parameters such as prevailing wind speed, energy output from the solar powered horizontal axis wind turbine apparatus 200, various other applications such as lighting, heating, etc., for which electrical energy is used.

In an embodiment, the solar powered horizontal axis wind turbine apparatus 200 disclosed herein further comprises a slip ring 210 connected to the photovoltaic cells 206 and in electric communication with the photovoltaic cells 206 to allow a continuous transfer of the electrical energy from the photovoltaic cells 206 to the energy storage devices 212a and 212b. The slip ring 210 is disposed on the stationary axle 201 of the frame 218 connected to the rotor assembly 202.

The slip ring 210 transfers the electrical energy produced by the photovoltaic cells 206 to the energy storage devices 212a and 212b for storage of the electrical energy.

In an embodiment, the solar powered horizontal axis wind turbine apparatus 200 disclosed herein further comprises a diode 211 electrically connected between the electric generator 208 and one energy storage device, for example, 212a for conducting electrical energy in only one direction, that is, from the electric generator 208 to the energy storage device 212a. The diode 211 prevents the electrical energy from being transferred back to the electric generator 208 from the energy storage device 212a.

During operation of the solar powered horizontal axis wind turbine apparatus 200, when the rotor assembly 202 housing the photovoltaic cells 206 rotates, the slip ring 210 mounted on the stationary axle 201 facilitates transfer of electrical energy from the photovoltaic cells 206 to the electric motor 215 and/or to the energy storage devices 212a and 212b. When the rotor assembly 202 is stationary, the electrical energy that is available in one of the energy storage devices 212a and 212b is transferred to the electric motor 215. Therefore, the solar powered horizontal axis wind turbine apparatus 200 disclosed herein facilitates bidirectional transfer of power from the photovoltaic cells 206 to the energy storage devices 212a and 212b via the slip ring 210 when the rotor assembly 202 housing the photovoltaic cells 206 rotates continuously, and from the energy storage devices 212a and 212b to the electric motor 215 when the rotor assembly 202 is stationary. The solar powered horizontal axis wind turbine apparatus 200 disclosed herein regulates the electrical energy to flow in a direction to serve the requirements of a user. For example, electrical energy flows from the photovoltaic cells 206 to the electric motor 215, or from the energy storage devices 212a and 212b to the electric motor 215, or from the photovoltaic cells 206 to the energy storage devices 212a and 212b, for example, by the switch 213, the diode 211, etc.

In an embodiment, one or more wind sensors 214 are operably disposed on one or more blades 204 of the rotor assembly 202 for monitoring data of the force of wind. A wind sensor 214 disposed on one of the blades 204 of the rotor assembly 202 is exemplarily illustrated in FIG. 2A. The wind sensors 214 measure the wind's speed and pressure. The wind sensors 214 gauge the speed of wind and ensure that the solar dome 203 of the rotor assembly 202 is rotated by the electric motor 215 only when the wind speed is slow and/or minimal. For example, if the wind speed is substantially less than the cut-in speed to generate the rotational motion in the blades 204 of the rotor assembly 202, the wind sensor 214 detects the reduction in the wind speed and starts the electric motor 215 powered by the photovoltaic cells 206 to rotate the blades 204 until the wind speed increases to a magnitude which can sustain a continuous rotation of the blades 204 of the rotor assembly 202.

FIG. 2B exemplarily illustrates a partial sectional view of the solar powered horizontal axis wind turbine apparatus 200, showing the electric motor 215 and the frame 218. The frame 218 supports the rotor assembly 202. In an embodiment, the frame 218 comprises a vertical tower 219 and the stationary axle 201. The stationary axle 201, having a first end 201a and a second end 201b, is perpendicularly connected to the vertical tower 219. The second end 201b of the stationary axle 201 is rigidly connected to the vertical tower 219. The rotor assembly 202 of the solar powered horizontal axis wind turbine apparatus 200 is rotatably connected to the frame 218 and rotates in response to a force of wind and the electric motor 215.

The rotor assembly 202 is rotatably connected to the first end 201a of the stationary axle 201 of the frame 218, for example, via one or more bearings 220. The solar dome 203 is rigidly connected to the first end 201a of the stationary axle 201 of the frame 218. In an embodiment, an anemometer 221 is operably connected to the frame 218 for measuring wind speed. In another embodiment, a tachometer 222 is operably connected to the frame 218 for measuring the speed of rotation of the rotor assembly 202. In an embodiment, the solar powered horizontal axis wind turbine apparatus 200 disclosed herein further comprises a weatherproof seal 223 that encapsulates the photovoltaic cells 206 on the solar dome 203 of the rotor assembly 202 for protecting the photovoltaic cells 206 from water and weather conditions.

The photovoltaic cells 206 are attached to the solar dome 203 by positioning adjacent photovoltaic cells 206 behind the weatherproof seal 223. In an embodiment, the weatherproof seal 223 is further configured to fixedly attach adjacent photovoltaic cells 206 in position on the solar dome 203 to prevent the photovoltaic cells 206 from being dislodged from the solar dome 203. As exemplarily illustrated in FIG. 2B, the electric motor 215 is axially positioned within the solar dome 203. The shaft 217 of the electric motor 215 extends from the body 216 of the electric motor 215 through the stationary axle 201 of the frame 218. In an embodiment, the shaft 217 is operably connected to the blades 204 of the rotor assembly 202 at a hub section 204a of the blades 204. The photovoltaic cells 206 are in electrical communication with the electric motor 215 via wires 225. The electrical energy generated in the photovoltaic cells 206 from exposure to incident sunlight is transferred to the electric motor 215 through the wires 225. The transferred electrical energy actuates the electric motor 215, thereby driving the body 216 of the electric motor 215 about the fixed shaft 217. Therefore, the blades 204 of the rotor assembly 202 rotate due to the rotation of the body 216 about the shaft 217 of the electric motor 215 and reduces or eliminates the cut-in speed required to rotate the blades 204 of the rotor assembly 202.

In an optional embodiment, the solar powered horizontal axis wind turbine apparatus 200 disclosed herein further comprises one or more flywheels 224 geared with each other and operably connected to the electric motor 215. One of the flywheels 224 is configured to be removably and operably connected to the shaft 217 of the electric motor 215 to provide a continuous momentum of rotation for the blades 204 of the rotor assembly 202.

FIG. 3A exemplarily illustrates a front elevation view of a solar powered vertical axis wind turbine apparatus 300 for reducing or eliminating wind cut-in speed. The solar powered vertical axis wind turbine apparatus 300 disclosed herein comprises the rotor assembly 301, a vertical axle 304, the solar dome 203 with the photovoltaic cells 206, and a first drive mechanism 303. The rotor assembly 301 is configured to rotate in a direction, for example, a clockwise direction or a counterclockwise direction, along a vertical axis Y-Y 302 of the rotor assembly 301 in response to a force of wind directed against blades 204. Rotation of the rotor assembly 301 produces mechanical energy. In an embodiment as exemplarily illustrated in FIG. 3A, the rotor assembly 301 is of a generally cylindrical shape. Alternatively, the rotor assembly 301 is, for example, of a conical shape or a bulged cylindrical shape. As exemplarily illustrated in FIG. 3A, the rotor assembly 301 comprises a closed upper end 301a, an open lower end 301b, and a side wall 301c defined between the closed upper end 301a and the open lower end 301b. The side wall 301c of the rotor assembly 301 is, for example, a cylindrical wall for the rotor assembly 301 of a cylindrical shape as exemplarily illustrated in FIG. 3A. The vertical axle 304 of the solar powered vertical axis wind turbine apparatus 300 disclosed herein is coaxially positioned within the rotor assembly 301 along the vertical axis Y-Y 302 of the rotor assembly 301.

In an embodiment, the rotor assembly 301 comprises the blades 204 configured on the side wall 301c of the rotor assembly 301. The rotor assembly 301 rotates about the vertical axis Y-Y 302 in response to the force of wind on the blades 204 and a powered electric motor 306 exemplarily illustrated in FIG. 3B. In an embodiment as exemplarily illustrated in FIG. 3A, the blades 204 are defined along the side wall 301c of the rotor assembly 301. Each of the blades 204 is of a predetermined shape, for example, a tear drop shape, a spade shape, a curved shape, etc., and is arranged adjacent to each other on the side wall 301c about the vertical axle 304. Each of the blades 204 provided on the side wall 301c of the rotor assembly 301 has, for example, a straight profile, a curved profile, or a curvilinear profile for increasing the surface area of exposure of the rotor assembly 301 to the force of wind to increase the speed of rotation of the rotor assembly 301. In an embodiment as exemplarily illustrated in FIG. 3A, the solar dome 203 that accommodates the photovoltaic cells 206 is positioned on the closed upper end 301a of the rotor assembly 301.

The solar dome 203 with the photovoltaic cells 206 of the solar powered vertical axis wind turbine apparatus 300 disclosed herein are rigidly attached to the closed upper end 301a of the rotor assembly 301. In an embodiment as exemplarily illustrated in FIG. 3A, the solar dome 203 accommodating the rigidly attached photovoltaic cells 206 extends beyond a periphery 301d of the closed upper end 301a of the rotor assembly 301. In this embodiment, the diameter of the first drive mechanism 303 of the rotor assembly 301 extends beyond the diameter of the solar dome 203. In another embodiment, the solar dome 203 is positioned on the closed upper end 301a of the rotor assembly 301 and contained within the periphery 301d of the closed upper end 301a of the rotor assembly 301. The photovoltaic cells 206 receive solar energy from incident sunlight and convert the received solar energy into electrical energy.

The first drive mechanism 303 of the solar powered vertical axis wind turbine apparatus 300 disclosed herein is rigidly connected around the side wall 301c of the rotor assembly 301 at the open lower end 301b of the rotor assembly 301. In an embodiment as exemplarily illustrated in FIG. 3A, the first drive mechanism 303 of the rotor assembly 301 is a gear ring 303a rigidly connected around the side wall 301c of the rotor assembly 301.

In an embodiment, the solar powered vertical axis wind turbine apparatus 300 disclosed herein further comprises an electric generator 208. The electric generator 208 is rotatably connected to the rotor assembly 301 via the first drive mechanism 303. The electric generator 208 comprising the second drive mechanism 305 is in engageable communication with the first drive mechanism 303 on the rotor assembly 301. The first drive mechanism 303 on the rotor assembly 301 engageably communicates with the second drive mechanism 305 of the electric generator 208 for transferring the mechanical energy produced by the rotation of the rotor assembly 301 to the electric generator 208. For example, the gear ring 303a of the rotor assembly 301 engageably communicates with the gear ring 305a of the electric generator 208 for transferring mechanical energy produced by the rotation of the rotor assembly 301 to the electric generator 208. The electric generator 208 converts mechanical energy produced by the rotation of the rotor assembly 301 into electrical energy. The solar powered vertical axis wind turbine apparatus 300 disclosed herein thereby produces energy in response to the force of wind directed against the blades 204 and the electrical energy from the photovoltaic cells 206 and the electric generator 208.

In an embodiment as exemplarily illustrated in FIG. 3A, the electric generator 208 is positioned in an upright position below the rotor assembly 301. In another embodiment, the electric generator 208 is positioned in an inverted position alongside the rotor assembly 301. In this embodiment, the second drive mechanism 305 of the electric generator 208 is configured to engageably connect to the first drive mechanism 303 of the rotor assembly 301 with sufficient clearance between the electric generator 208 and the rotor assembly 301. For example, the diameter of the second drive mechanism 305 of the electric generator 208 is extended beyond the diameter of the electric generator 208.

FIG. 3B exemplarily illustrates a partial cut-away front sectional view of an embodiment of the solar powered vertical axis wind turbine apparatus 300, showing the electric motor 306. The electric motor 306 is connected to and is in electric communication with the photovoltaic cells 206 rigidly attached to the solar dome 203. The solar dome 203 is positioned on the closed upper end 301a of the rotor assembly 301. The electric motor 306 is coaxially disposed below the photovoltaic cells 206. In this embodiment, the solar powered vertical axis wind turbine apparatus 300 disclosed herein further comprises a spiral groove 309 defined along an inner surface 301e of a truncated cone 312 of the rotor assembly 301. The rotor assembly 301 rotates about the vertical axis Y-Y 302 in response to a force of thermal updraft of air flow against the spiral groove 309. The thermal updraft of air is caused as a result of convection of hot air relative to cold air from the atmosphere. Hot air from below the open lower end 301b of the rotor assembly 301 replaces the cold air within the rotor assembly 301. This replacement of the cold air by the hot air gives rise to convection currents that appear as the thermal updraft of air. The thermal updraft of air enters the rotor assembly 301 through the open lower end 301b of the rotor assembly 301 and is directed against the spiral groove 309 for rotating the rotor assembly 301.

The air that enters into the rotor assembly 301 from the open lower end 301b of the rotor assembly 301 is exemplarily illustrated by curved arrows 313. The thermal updraft of the air that flows against the spiral groove 309 within the rotor assembly 301 is exemplarily illustrated by curved arrows 314. The air flow against the spiral groove 309 in turn rotates the rotor assembly 301.

The photovoltaic cells 206 capture solar energy from sunlight and convert the captured solar energy into electrical energy. The photovoltaic cells 206 transfer the electrical energy to the electric motor 306 to power the electric motor 306. The electric motor 306 rotates on receiving the electrical energy and rotates the rotor assembly 301. In this embodiment, the vertical axle 304 of the solar powered vertical axis wind turbine apparatus 300 is rigidly connected to the shaft 307 of the electric motor 306 and coaxially positioned within the rotor assembly 301 along the vertical axis Y-Y 302 of the rotor assembly 301. The rotor assembly 301 is rotatably connected to the vertical axle 304, for example, by the bearings 308a, a sleeve 308b, etc., to enable rotation of the rotor assembly 301 relative to the vertical axle 304. The electric motor 306 powered by the photovoltaic cells 206 on the solar dome 203 provides the initial power to initiate the rotation of the blades 204 of the rotor assembly 301 when the speed of wind is less than the cut-in speed, thereby reducing or eliminating the cut-in speed required to rotate the blades 204 of the rotor assembly 301.

In an embodiment, the solar powered vertical axis wind turbine apparatus 300 disclosed herein further comprises an energy storage device 212a electrically connected to the photovoltaic cells 206 and the electric generator 208. The energy storage device 212a stores the electrical energy output from the photovoltaic cells 206 and the electric generator 208. The electrical energy stored in the energy storage device 212a can be used to kick start and rotate the blades 204 of the rotor assembly 301 when there is minimal or no wind in the vicinity of the solar powered vertical axis wind turbine apparatus 300.

In an embodiment, the solar powered vertical axis wind turbine apparatus 300 disclosed herein further comprises a slip ring 310 positioned on the shaft 307 of the electric motor 306. The slip ring 310 enables the photovoltaic cells 206 to transmit the electrical energy to the energy storage device 212a when the electric motor 306 is electrically disconnected from the photovoltaic cells 206 via a switch 311. The slip ring 310 enables the photovoltaic cells 206 to execute continuous rotations of the rotor assembly 301 while electrical energy is continuously transferred from the photovoltaic cells 206 to the energy storage device 212a via the slip ring 310. The rotor assembly 301 continues to rotate even after the electrical disconnection of the electric motor 306 and the photovoltaic cells 206 by the switch 311. Meanwhile, the electrical energy of the photovoltaic cells 206 is also concurrently transferred to the energy storage device 212a.

Consider an example where the solar powered vertical axis wind turbine apparatus 300 is utilized. The photovoltaic cells 206 disposed on the closed upper end 301a of the rotor assembly 301 receive solar energy from sunlight and convert the solar energy into electrical energy. The electrical energy of the photovoltaic cells 206 is transferred to the electric motor 306 and causes the electric motor 306 to rotate about its shaft 307 rigidly connected to the vertical axle 304 within the rotor assembly 301. The electric motor 306 further rotates the rotor assembly 301. The electric motor 306 powered by the photovoltaic cells 206 on the solar dome 203 provides the initial start up speed for rotating the blades 204 of the rotor assembly 301 and therefore reduces or eliminates the cut-in speed required to rotate the blades 204 of the rotor assembly 301. Furthermore, wind impinges on the blades 204 on the rotor assembly 301. The force of wind against the blades 204 continues the rotation of the rotor assembly 301. The thermal updraft of air flow causes a spinning effect of the rotor assembly 301 caused by the upward air flow impinging and moving along the spiral groove 309 defined along the inner surface 301e of the rotor assembly 301. This spinning effect also causes the rotor assembly 301 to rotate about the vertical axle 304 on which the rotor assembly 301 is rotatably connected. The rotation of the rotor assembly 301 rotates the electric generator 208 that is rotatably connected to the first drive mechanism 303 of the rotor assembly 301 via its drive mechanism 305. The electric generator 208 converts the mechanical energy of the rotor assembly 301 into electrical energy. The solar powered vertical axis wind turbine apparatus 300 disclosed herein thereby produces energy.

The solar powered horizontal axis wind turbine apparatus 200 exemplarily illustrated in FIGS. 2A-2B and the solar powered vertical axis wind turbine apparatus 300 exemplarily illustrated in FIGS. 3A-3B, each require a different method for mounting the solar dome 203. The electric motor 215 or 306 powered by the photovoltaic cells 206 on the solar dome 203 provide the initial start up power for the solar powered wind turbine apparatus 200 or 300. In this case, the shaft 217 or 307 of the electric motor 215 or 306 is fixed. Once the rotor assembly 202 or 301 starts to rotate, the wind speed continuously rotates the rotor assembly 202 or 301. The additional energy provided by the photovoltaic cells 206 in the solar dome 203 can also be stored in an energy storage device, for example, 212a that is in electric communication with the photovoltaic cells 206 on the solar dome 203 and/or used for other purposes.

Figure 4:
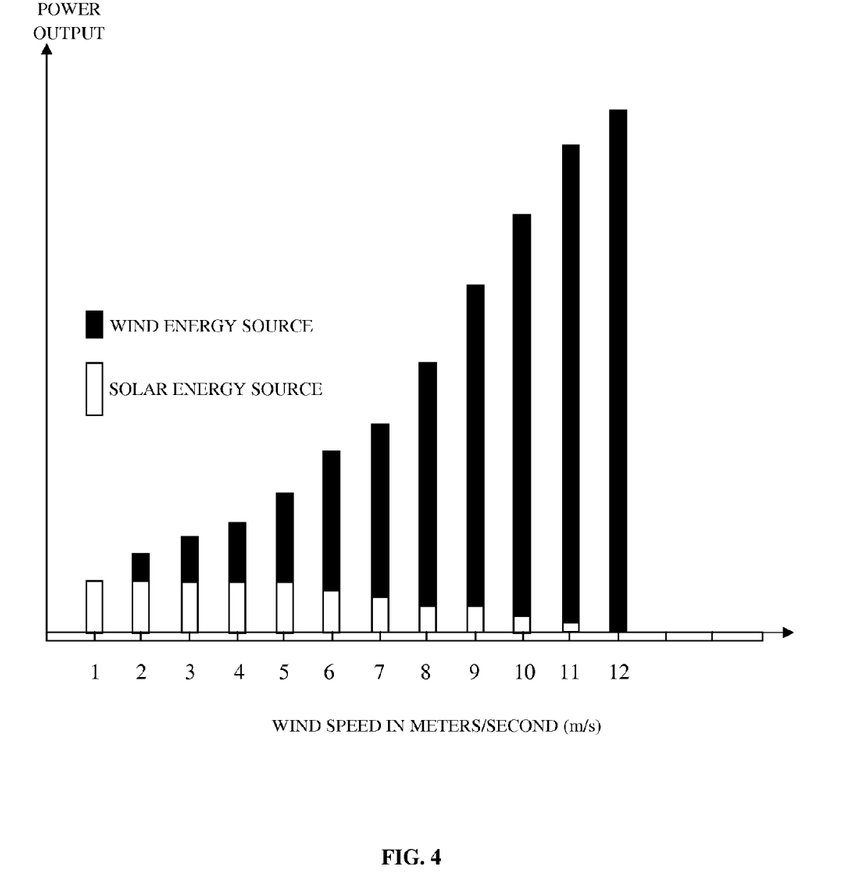
FIG. 4 exemplarily illustrates a graphical representation of power output of the solar powered wind turbine apparatus powered by wind energy and solar energy.

FIG. 4 exemplarily illustrates a graphical representation of power output of the solar powered wind turbine apparatus 200 or 300 exemplarily illustrated in FIGS. 2A-2B and FIGS. 3A-3B, powered by wind energy and solar energy. The solar powered horizontal axis wind turbine apparatus 200 exemplarily illustrated in FIGS. 2A-2B, or the solar powered vertical axis wind turbine apparatus 300 exemplarily illustrated in FIGS. 3A-3B is a hybrid solar and wind turbine. At any given point of time, due to the position of the sun during the day, actual solar energy output from incident sunlight changes based on the radiation of the sun. Unused solar energy received from the sun is transferred and stored in one or more energy storage devices, for example, 212a, 212b, etc., exemplarily illustrated in FIG. 2A and FIG. 3B, in the form of electrical energy. The stored electrical energy can be recycled and used by the solar powered wind turbine apparatus 200 or 300 when wind speed drops below the cut-in speed, or when the wind speed is in between the cut-in speed and the cut-out speed.

As exemplarily illustrated in FIG. 4, solar energy acts as a primary driving force for power generation by the solar powered wind turbine apparatus 200 or 300 for up to about 4 meters/second (m/s) of wind speed. Once the wind speed reaches to about 12 m/s, the total power output contributed by the wind energy typically remains flat, irrespective of the wind as exemplarily illustrated in FIG. 4. The difference of the gradually reducing contribution of the solar energy in power generation can be transferred to the energy storage devices, for example, 212a, 212b, etc.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

We claim:

1. A method for initiating rotation of blades of a wind turbine when a speed of wind is less than a cut-in speed for rotation of said blades, said method comprising:
   providing a solar powered wind turbine apparatus, comprising:
     at least one wind sensor to monitor wind speed;
     a rotor assembly comprising a plurality of said blades, wherein said blades are operably connected to a shaft of an electric motor, and wherein said rotor assembly rotates in response to a force of said wind on said blades, and a solar dome configured to house and support an interconnected assembly of photovoltaic cells on a surface of said solar dome, said photovoltaic cells configured to receive solar energy from incident sunlight, convert said received solar energy into electrical energy, and transfer said electrical energy to said electric motor, said electric motor electrically connected to said photovoltaic cells housed in said solar dome, said electric motor powered by said photovoltaic cells to initiate said rotation of said blades of said rotor assembly when said speed of said wind is less than said cut-in speed, receiving solar energy from incident sunlight by said photovoltaic cells of said solar powered wind turbine apparatus;

converting said received solar energy from said incident sunlight on said photovoltaic cells into electrical energy by said photovoltaic cells;

measuring wind speed with said at least one wind sensor;

responsive to said measured wind speed being below said cut-in speed, transferring as initiated by said at least one wind sensor said electrical energy produced by said photovoltaic cells to said electric motor of said solar powered wind turbine apparatus; and rotating said blades of said rotor assembly, by said electric motor using said electrical energy transferred by said photovoltaic cells, thereby one of reducing and eliminating said cut-in speed required for said rotation of said blades wherein providing the solar powered wind turbine apparatus, comprises a spiral groove affixed within the dome to generate a thermal updraft as air enters the rotor assembly and is directed against the spiral groove.

2. The method of claim 1, further comprising:
responsive to wind speed being above the cut-in speed, storing electrical energy produced by the photovoltaic cells in one or more energy storage devices, wherein the one or more energy storage devices are in electric communication with said photovoltaic cells, wherein said stored electrical energy activates rotation of said blades when there is no said wind, and supports rotation of said blades wind speed is at a level between the cut-in speed and a cut-out speed.

3. The method of claim 1, further comprising:
responsive to wind speed being above the cut-in speed, electrically switching an electrical circuit formed by the photovoltaic cells, the electric motor, and the one or more energy storage devices to redirect electrical energy to the one or more energy storage devices.

4. The method of claim 3, wherein wind continues to rotate said blades subsequent to electrical disconnection of said photovoltaic cells from said electric motor.

5. The method of claim 1, further comprising:
engageably connecting an electric generator to said rotor assembly via a first drive mechanism, wherein said first drive mechanism is rigidly attached to said blades and encircles said blades of said rotor assembly, wherein said first drive mechanism connected to said rotor assembly is in engageable communication with a second drive mechanism rigidly connected to said electric generator, wherein said first and second drive mechanisms are geared wheels, and wherein said electric generator is configured to convert mechanical energy produced by said rotor assembly to additional electrical energy.

6. The method of claim 5, further comprising:
electrically connecting said electric generator to one or more energy storage devices, wherein said one or more energy storage devices are configured to store said additional electrical energy produced by said electric generator, and wherein said stored additional electrical energy is configured to one of activate said electric motor by powering said electric motor to rotate said blades of said rotor assembly when there is no wind, and support said rotation of said blades of said rotor assembly by powering said electric motor when a speed of said wind is at a level between said cut-in speed and a cut-out speed.

7. A solar powered wind turbine apparatus for initiating rotation of the blades of a wind turbine when the wind speed is less than a cut-in speed, said solar powered wind turbine apparatus comprising:

at least one wind sensor to monitor wind speed;

a rotor assembly comprising a plurality of blades, wherein said blades are operably connected to a shaft of an electric motor, and wherein said rotor assembly rotates in response to a force of said wind on said blades;

a solar dome configured to house and support an interconnected assembly of photovoltaic cells on a surface of said solar dome, said photovoltaic cells configured to receive solar energy from incident sunlight, convert said received solar energy into electrical energy, and wherein responsive to the measured wind speed being below said cut-in speed, said at least one wind sensor is configured to initiate transferring said electrical energy to an electric motor; and said electric motor electrically connected to said photovoltaic cells housed in said solar dome, said electric motor configured to be powered by said photovoltaic cells to initiate a rotation of said blades of said rotor assembly using said electrical energy transferred by said photovoltaic cells, when a speed of wind is less than said cut-in speed, thereby one of reducing and eliminating said cut-in speed required for said rotation of said blades wherein providing the solar powered wind turbine apparatus, comprises a spiral groove affixed within the dome to generate a thermal updraft as air enters the rotor assembly and is directed against the spiral groove.

8. The solar powered wind turbine apparatus of claim 7, wherein said solar dome is configured to rotate about said horizontal to enable said photovoltaic cells to receive said solar energy from multiple directions of said incident sunlight.

9. The solar powered wind turbine apparatus of claim 7, further comprising
one or more energy storage devices in electric communication with said photovoltaic cells on said solar dome of said rotor assembly, wherein said one or more energy storage devices are configured to store said electrical energy produced by said photovoltaic cells, and wherein said stored electrical energy is configured to one of activate said electric motor by powering said electric motor to rotate said blades of said rotor assembly when there is no said wind, and support said rotation of said blades of said rotor assembly by powering said electric motor when said speed of said wind is at a level between said cut-in speed and a cut-out speed.

10. The solar powered wind turbine apparatus of claim 9, further comprising a switch in electric communication with said photovoltaic cells, said electric motor, and said one or more energy storage devices, wherein said switch is configured to break an electrical circuit formed by said photovoltaic cells, said electric motor, and said one or more energy storage devices to interrupt said electrical energy, thereby electrically disconnecting said photovoltaic cells from said electric motor and transferring said electrical energy produced by said photovoltaic cells to said one or more energy storage devices, wherein said rotation of said blades of said rotor assembly is further continued by a force of said wind on said blades of said rotor assembly after said electrical disconnection of said photovoltaic cells from said electric motor.

11. The solar powered wind turbine apparatus of claim 9, further comprising a slip ring disposed on a stationary axle of a frame connected to said rotor assembly, wherein said slip ring is connected to and in electric communication with said photovoltaic cells, and wherein said slip ring is configured to continuously transfer said electrical energy from said photovoltaic cells to said one or more energy storage devices.

12. The solar powered wind turbine apparatus of claim 7, further comprising an electric generator engageably connected to said rotor assembly via a first drive mechanism, wherein said first drive mechanism is rigidly attached to said blades and encircles said blades of said rotor assembly, wherein said first drive mechanism connected to said rotor assembly is in engageable communication with a second drive mechanism rigidly connected to said electric generator, wherein said first and second drive mechanisms are geared wheels, and wherein said electric generator is configured to convert mechanical energy produced by said rotor assembly to additional electrical energy.

13. The solar powered wind turbine apparatus of claim 12, wherein said electric generator is electrically connected to one or more energy storage devices, wherein said one or more energy storage devices are configured to store said additional electrical energy produced by said electric generator, and wherein said stored additional electrical energy is configured to one of activate said electric motor by powering said electric motor to rotate said blades of said rotor assembly when there is no wind, and support said rotation of said blades of said rotor assembly by powering said electric motor when a speed of said wind is at a level between said cut-in speed and a cut-out speed.

14. The solar powered wind turbine apparatus of claim 7, further comprising a weatherproof seal encapsulating said photovoltaic cells on said solar dome of said rotor assembly, wherein said weatherproof seal is configured to protect said photovoltaic cells from water and weather conditions.

15. The solar powered wind turbine apparatus of claim 14, wherein said weatherproof seal is further configured to fixedly attach adjacent said photovoltaic cells in position on said solar dome to prevent said photovoltaic cells from being dislodged from said solar dome.

* * * * *